Jan. 30, 1962

D. H. LANCTOT 3,019,402

STEP ATTENUATOR

Filed Feb. 1, 1960

2 Sheets-Sheet 1

INVENTOR
DONALD H. LANCTOT
BY Elliott & Pastoriza
ATTORNEYS

Jan. 30, 1962 D. H. LANCTOT 3,019,402

STEP ATTENUATOR

Filed Feb. 1. 1960 2 Sheets-Sheet 2

INVENTOR
DONALD H. LANCTOT
BY Elliott & Pastoriza
ATTORNEYS 3,019,402
STEP ATTENUATOR
Donald H. Lanctot, Malibu, Calif., assignor to Don-Lan Electronics, Inc., a corporation of California
Filed Feb. 1, 1960, Ser. No. 5,776
4 Claims. (Cl. 333—81)

This invention relates generally to high frequency co-axial components and more particularly to a step attenuator for insertion in a co-axial line carrying high frequency electro-magnetic energy.

In micro-wave systems there are many instances in which the same co-axial line is employed for transferring electro-magnetic energy to different instruments in the system. For example, the co-axial line used to pass energy from a transmitter to an antenna may also be used to pass energy received from the antenna to a receiver. To insure maximum power transfer in each use of the line, it is important that a proper impedance match for each function be effected. There thus arise situations in which it is desirable to introduce a fixed impedance into a co-axial line when used for carrying electro-magnetic energy to one particular piece of equipment and in which the impedance can be wholly removed in so far as the energy is concerned, when passing the energy to another piece of equipment.

In addition to impedance matching functions, temporary introduction of a fixed impedance in a co-axial line enables energy passing through a co-axial line to be attenuated in a discrete step to a given level for one given function, and passed straight through the line without any substantial attenuation for another function.

With the foregoing in mind, it is a primary object of the present invention to provide a step attenuator which will enable attenuation of electro-magnetic energy by a discrete amount.

More particularly, it is an object to provide a step attenuator for insertion in a co-axial line which is extremely fast acting to the end that the component is adaptable to high speed operations.

Another object is to provide a step attenuator which is compact, extremely rugged, and which is capable of operation from remote locations.

Still another object of the invention is to provide a step attenuator which incorporates means for filtering electro-magnetic energy passed therethrough when the attenuation network is removed from the circuit. Such filtering action is often desirable in that it narrows the band width requirements of receiving or measuring instruments thereby increasing the signal-to-noise ratio, and at the same time provides effective measures against jamming by unauthorized parties.

Briefly, these and many other objects and advantages of this invention are attained by providing a body member having first and second co-axial connectors extending into opposite sides. The inner conductors of the members terminate in flexible reeds extending towards each other in opposed spaced relationship. The reeds themselves are normally biased laterally so that they are out of engagement with each other and respectively in engagement with suitable first and second resistance elements. A third resistance element is included within the body and arranged to be electrically connected between the inner conductors of the connectors when the reeds are in their laterally biased position. By this arrangement, a pie type attenuation network is introduced into the co-axial line connected to the connectors.

The body also includes an actuating means arranged to move the reeds out of engagement with the resistance elements and simultaneously bridge the free ends of the flexible reeds thereby completing a straight-through connection of the inner conductors. Because of the extremely small mass of the flexible reeds and the small movement which takes place, an extremely high speed operation is realizable for switching between an attenuated condition and a straight through connection.

A better understanding of the invention and its various preferred embodiments will now be had by referring to the accompanying drawings in which.

Figure 1:
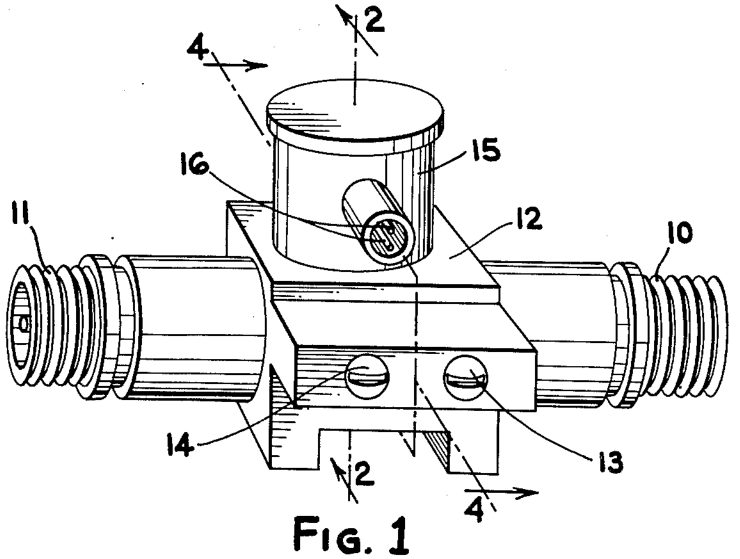
FIGURE 1 is an overall perspective view of a first embodiment of the step attenuator of this invention.

Referring first to FIGURE 1, there are shown first and second co-axial connectors 10 and 11 received in the opposite ends of a conducting body 12. First and second attenuating resistances incorporated within the body 12 terminate in removable screw heads 13 and 14 on the front side of the body as shown. By this arrangement, the attenuating resistances may be changed in value as will become clearer as the description proceeds.

An upper housing 15 is provided for suitable actuating means arranged to effect either a straight through connection or insertion of an attenuation network between the connectors 10 and 11. The actuating means itself may be operated from a remote location by passing a signal into suitable input leads 16 extending into the housing 15.

Figure 2:
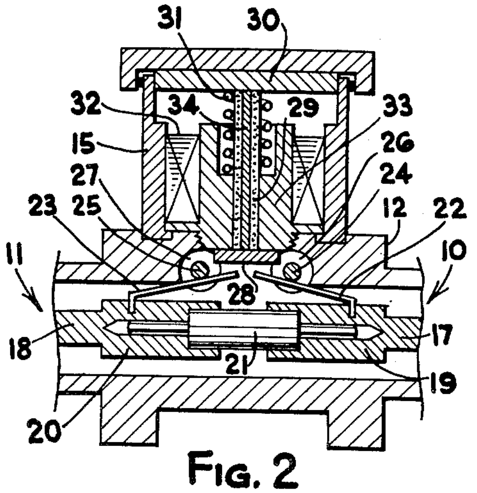
FIGURE 2 is a cross section taken generally in the direction of the arrow 2—2 of FIGURE 1 showing certain components within the body portion of the device in a first position in which attenuation of a signal passed through the device is effected.
Figure 3:
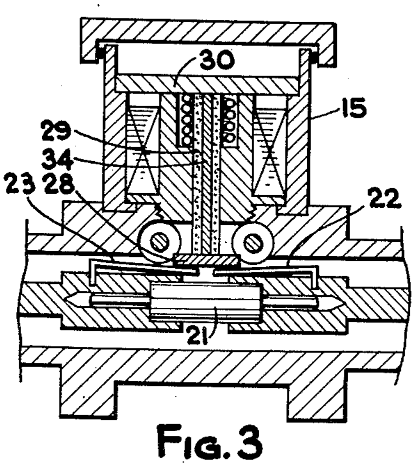
FIGURE 3 is another cross section similar to FIGURE 2 illustrating a second position of the components in which a straight through connection is effected.
Figure 4:
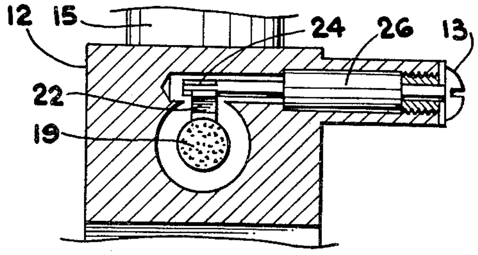
FIGURE 4 is a fragmentary cross section taken generally in the direction of the arrows 4—4 of FIGURE 1.

Referring now to FIGURES 2, 3, and 4, the manner in which the step attenuator is construuted in accordance with the first embodiment of the invention will become clear. As shown in FIGURE 2, the inner conductors 17 and 18 for the connectors 10 and 11 terminate in enlarged heads 19 and 20 in opposed axially spaced relationship. A third resistance element 21 is connected in series between these heads as shown. The heads also serve to support fixed ends of first and second flexible conducting reeds 22 and 23. The free ends of the reeds bear respectively against contacting surfaces 24 and 25 for the first and second resistances 26 and 27 associated with the end screw heads 13 and 14 of FIGURE 1.

The foregoing structure will become clearer by reference to FIGURE 4 which illustrates the first resistance element 26 with its outer end terminating in the screw-head 13 for easy removal from the body 12 and its inner contacting end 24 in engagement with the flexible reed 22 extending from the inner conductor head 19. Since the body 12 is of conducting material and electrically connects the outer conductors of the connectors 10 and 11, the resistance element 26 is effectively connected between the outer conductor and the inner conductor of the connector 10 through the flexible reed 22. A similar arrangement connects the second resistance element 27 between the inner conductor 18 and outer conductor of the connector 11 through the second flexible reed 23 so that the inner ends of the connectors are effectively terminated in the first and second resistances 26 and 27 when the flexible reeds 22 and 23 are in the position illustrated in FIGURE 2. The reeds are normally in this position as a consequence of their natural bias in a lateral direction.

Extending laterally into the body adjacent the free end of the reeds is a conducting bridging head 28 at the lower end of a plunger 29 constituting an actuating means for the device. The upper end of the plunger 29 terminates in a plate 30 biased to its uppermost position against the top of the housing 15 by a compression spring 31. Suitable electro-magnetic coils 32 surrounding a core 33 which also serves as a guide for the plunger 29 are arranged to be energized through the leads 16 described in connection with FIGURE 1.

When the coils are energized, the plunger 29 will be moved downwardly to the position illustrated in FIGURE 3 in which the end conducting head 28 electrically connects the free ends of the reeds 22 and 23. The downward movement of the plunger simultaneously disconnects the free ends of the reeds from the inner contacts 24 and 25 of the first and second resistance elements thereby removing them from the circuit. A straight through connection between the inner conductors of the connectors is thus effected, the third resistance 21 being simply shunted out of the circuit.

Figure 5:
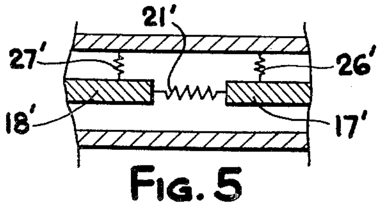
FIGURE 5 is a schematic diagram of the equivalent electrical circuit of the attenuation network.

Referring to the schematic diagram of FIGURE 5, there is shown an electrical equivalent circuit wherein the components are designated by numerals with primes corresponding to the equivalent components in FIGURES 2, 3, and 4. In FIGURE 5, it will be evident that when the flexible reeds of FIGURE 2 are in the position shown there is inserted between the connectors a pie attenuation network comprising the parallel resistances 26′ and 27′ on either side of the inner series resistance 21′.

The operation of the first embodiment of the invention illustrated in FIGURES 1–4 will be evident from the foregoing description. In its unenergized condition, the attenuation network comprising the first and second resistances 26 and 27 and the series resistance 21 is connected between the input and output connectors 10 and 11. Thus, when the device is inserted in a co-axial line, electro-magnetic energy passing through the line will be attenuated by the pie resistance network to provide a proper impedance match into any particular piece of equipment or yield a desired signal level. When it is desired to remove the attenuating network, the electro-magnetic coils 32 may be energized by applying a signal to the input leads 16 of FIGURE 1 to move the plunger 29 downwardly from the position shown in FIGURE 2 to the position shown in FIGURE 3. When in the position shown in FIGURE 3, a straight through electrical connection is provided for the inner conductors as described and the resistance elements are effectively removed from the circuit.

In connection with the foregoing, it should be understood that the provision of the reeds and plunger as described enables extremely rapid operation to take place. The reeds themselves are of extremely small mass and in actual embodiments of the invention need move only a few mils from the position illustrated in FIGURE 2 to that shown in FIGURE 3. Thus, not only is a rapid response assured, but because of the small mass, the entire structure is relatively immune to sudden impacts, high *g* loadings, shocks, vibrations, and the like.

In many operations as described heretofore in connection with high-frequency systems it is desirable to filter a received signal. In accordance with the present invention, a desired filtering action can be attained by proper dimensioning of the plunger 29 and incorporation of a conducting portion therein. For example, referring again to FIGURES 2 and 3 there is shown a conducting member 34 incorporated within the plunger structure 29 and extending between the lower end head 28 and upper end plate 30. The length of the conducting portion 34 is made equal to an odd multiple of a quarter wave length of the mean wave length of the electro-magnetic energy to be passed through the line.

In operation, when the plunger is in the position illustrated in FIGURE 3, there is provided a conducting path from the head 28 through the conducting portion 34 to the outer conductors of the co-axial connectors by way of the upper end plate 30 housing 15 and body 12. However, the conducting portion 34 being an odd multiple of a quarter wave length will appear as an open circuit for electro-magnetic energy of a wave length defined by the dimensioning of the conducting portion and only electro-magnetic energy of a wave length will be passed. Energy of different wave lengths will be attenuated by the presence of the stub which will then no longer appear as an open circuit. Therefore, only a desired band of frequencies will be passed and the remaining portions filtered by action of the stub. When the stub is employed, the conducting portion itself can serve as part of the magnetic circuit for the plunger. Otherwise, the plunger portion 29 between the end head 28 and upper plate 30 is of electrically insulated material, the upper end plate 30 itself serving to complete the magnetic circuit when the coils are energized.

Figure 6:
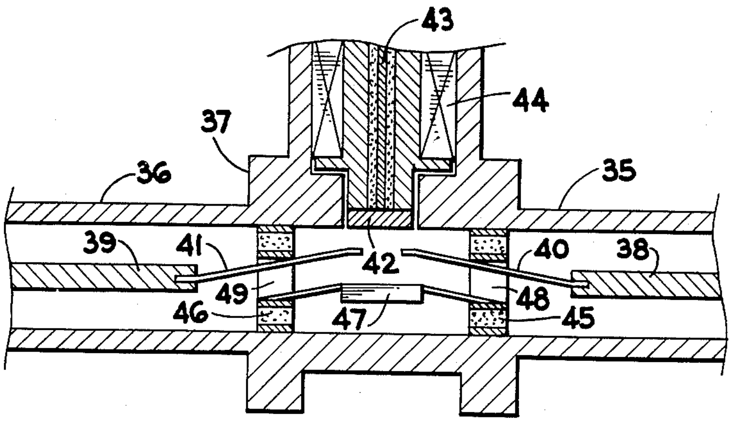
FIGURE 6 is a cross section of a second embodiment of the attenuator with the movable components in a first position.
Figures 7, 8:
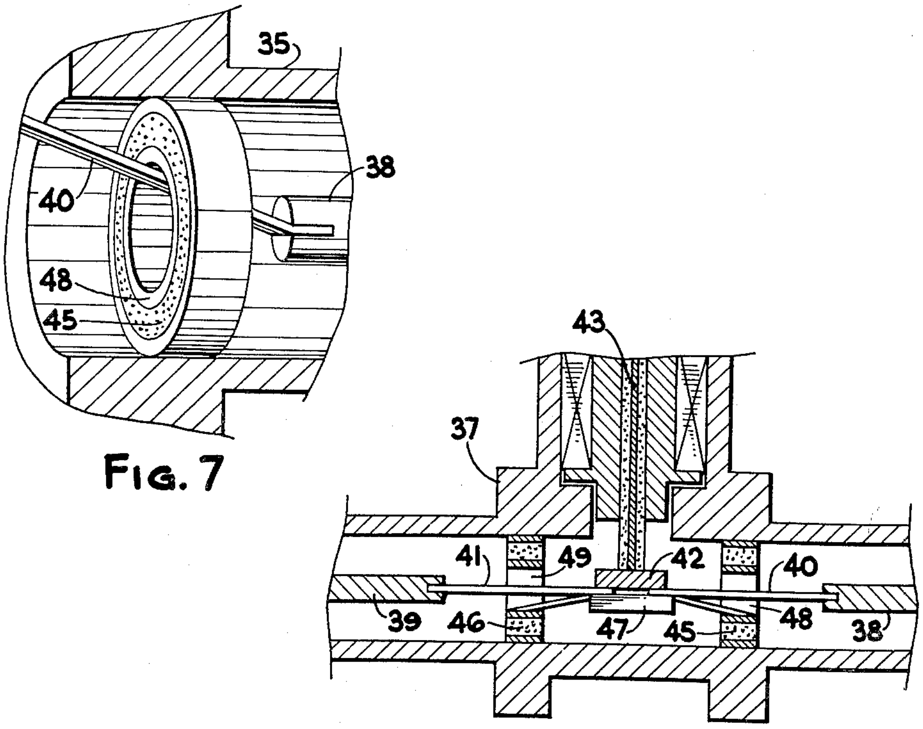
FIGURE 7 is an enlarged fragmentary cut-away perspective view showing one of the resistance elements incorporated in the device of FIGURE 6; and, FIGURE 8 is a view similar to FIGURE 6 showing the movable components in a second position for effecting a straight through connection.

Referring now to FIGURES 6, 7, and 8 there is shown a second embodiment of the invention similar in many respects to the first described embodiment except for the type of resistance elements employed in the attenuating network. Referring first to FIGURE 6 there are shown input and output co-axial connectors 35 and 36 received in opposite sides of a central body 37. The inner conductors 38 and 39 terminate in flexible reeds 40 and 41 laterally biased in the same direction as shown so that the free ends of the reeds face each other in opposed relationship. A suitable actuating means is provided including a lower end conducting head 42 and plunger structure 43 arranged to be actuated by suitable coils 44 in exactly the same manner as the end 28, plunger 29, and coils 32 of the embodiment of FIGURES 2, 3, and 4.

In FIGURE 6, the first and second resistance elements of the attenuation network are in the form of disc type resistances 45 and 46 provided with center apertures in axial alignment with the inner conductors of the connectors so that the flexible reeds 40 and 41 respectively pass through the apertures. A third resistance element 47 is connected between the resistances 45 and 46 through inner ring conductors 48 and 49 defining the inner walls of the apertures of the resistances. In the position of the components illustrated in FIGURE 6, the reeds 40 and 41 are biased into contact with the same ring conductors 48 and 49 defining the apertures of the disc so that the desired pie attenuation network is in the circuit. FIGURE 7 illustrates the geometry of the disc shaped resistance element more clearly wherein the connection of the third resistance 47 is omitted to avoid obscuring the drawing.

FIGURE 8 illustrates the same components shown in FIGURE 6 with the plunger in actuated condition to remove the pie attenuation network. As shown, when the plunger is moved to the down position, the conducting head 42 will shunt the free ends of the flexible reeds 40 and 41 to effect a desired straight through connection. Simultaneously, the downward movement will disconnect the reeds from the disc resistances 45 and 46. The third resistance 47 is also effectively removed from the circuit as a consequence of the disengagement of the reeds from the inner conducting rings 48 and 49 of the disc resistances so that all of the resistance elements are wholly outside of the circuit.

In the second embodiment of the invention described in FIGURES 6, 7, and 8, the primary advantage resides in the greater compactness of the structure that can be achieved by the use of the disc shaped resistance elements. In addition, a more geometrically straight through connection can be effected between the inner conductors when the attenuation network is removed. This straight through connection is extremely desirable in that it minimizes any discontinuities or reflections when passing electro-magnetic energy from the input connector to the output connector. On the other hand, the device is not as adaptable as the embodiment of FIGURES 1–4 should it be desired to change the value of the resistances. Thus, each of the embodiments will be useful depending upon the particular application to which it is to be put.

From the foregoing description, it will be evident that the present invention has provided a greatly improved co-axial component for enabling the insertion of a discrete impedance within a co-axial line. In both embodiments, the desirable features of extremely rapid operation as a consequence of the small mass and small degree of movement of the reeds necessary to change from one condition to another is achieved. In addition, the small mass and compact design renders both embodiments extremely rugged and capable of withstanding severe environmental conditions.

Many modifications that fall clearly within the scope and spirit of this invention will occur to those skilled in the art. The step attenuator is therefore not to be thought of as limited to the exact structures set forth merely for illustrative purposes.

What is claimed is:

1. A step attenuator for insertion into a co-axial line carrying electro-magnetic energy, comprising: a body having input and output co-axial connectors in opposite sides, the inner conductors of said connectors terminating in first and second opposed axially spaced ends; first and second flexible reeds secured to said ends respectively with free end portions extending towards each other, said reeds being biased laterally to a first position; first and second resistance elements respectively connected between said free end portions of said reeds and the outer conductors of said connectors when said reeds are in said first position; a third resistance element electrically connected between said inner conductors when said reeds are in said first position; and actuating means extending laterally into said body adjacent to said free end portions and adapted upon actuation to move said reeds to a second position in which they are axially aligned, said actuating means electrically connecting said free end portions of said reeds and disconnecting them from said first and second resistance elements when in said second position.

2. The subject matter of claim 1, in which said actuating means includes a plunger incorporating a conducting portion of length equal to an odd multiple of a quarter wave length of the mean operating wave length of said electro-magnetic energy, one end of said conducting portion being electrically connected to the free end portions of said reeds and the other end to said outer conductors to provide a quarter wave stub when said reeds are in said second position.

3. The subject matter of claim 2, including electromagnetic coils surrounding said plunger, said conducting portion providing part of the magnetic circuit for said coils whereby energization of said coils moves said plunger to actuate said reeds.

4. The subject matter of claim 1, in which said first and second resistance elements comprise disc shaped members of resistance material disposed in said body normal to the axis of said connectors respectively, and having central apertures through which said flexible reeds pass, intermediate portions of said reeds making electrical connection with the inner walls of said central apertures when in said first position and being free of said inner walls when moved to said second position by said actuating means.

References Cited in the file of this patent

UNITED STATES PATENTS

| | | |
|---|---|---|
| 2,597,090 | Freeman | May 20, 1952 |
| 2,690,540 | Boothby | Sept. 28, 1954 |